Patented Oct. 14, 1947

2,429,060

UNITED STATES PATENT OFFICE 2,429,060

CONTROLLING POLYMERIZATION OF DI-HYDRIC ALCOHOL ESTERS OF ALPHA-OLEFINIC DICARBOXYLIC ACIDS WITH ETHYLENIC MONOMERS

Walter R. Hoover and Robert M. Paulsen, Mishawaka, and Stephen V. Landgraf, Elkhart, Ind., assignors to United States Rubber Company, New York, N. Y., a corporation of New Jersey No Drawing. Application March 21, 1944, Serial No. 527,492

7 Claims. (Cl. 260—45.4)

This invention relates to a method of impregnating fibrous sheets or cloths with heat-hardenable resins to form relatively stiff sheets or laminated sheets having a hard tough non-cracking surface, and more particularly to a method of controlling the transition of the liquid resin to a solid infusible state, in order to avoid undesirable and uncontrollable flow of the resin and consequent unevenness of the surface of the final product.

It is customary to apply what are known as substantially 100% polymerizable low pressure resinous compounds as a liquid to various fibrous bases, formed of fibres (vegetable, animal, and/or mineral), before laminating the bases or plying them up in a mold. Ordinarily, the liquid impregnated fibrous sheet is heated by suitable external means, even though exothermic heat is evolved in the polymerization reaction, at which time the resin slowly becomes less viscous until such a time as the polymerization reaches the gelled state, and then the resinous compound polymerizes rapidly and finally becomes a hard and stable mass. In working with these resins it is very difficult to force the resins to remain on vertical surfaces when forming parts where vertical surfaces are required. Because of the decrease of viscosity as a result of heating of the resin, and consequential tendency of the resin to flow from or along the impregnating base, the vertical areas in the formed parts are insufficiently impregnated with the polymerizing resin mix, and consequently, are starved and weak. Difficulty is also encountered in forming absolutely smooth surfaces on flat sheets with such resins.

The application of external heat has heretofore been necessary to gel and polymerize the resin even where the resin contains a catalyst of polymerization such as benzoyl peroxide, and this same heat is the cause of decreasing the viscosity of the resin before gelation, whereby it uncontrollably flows as stated above.

We have now found that if the polymerizable liquid resinous material, containing any suitable catalyst of polymerization, e. g., benzoyl peroxide, is compounded with a hydrazine such as phenyl hydrazine, that the resin substantially immediately commences to polymerize and in a very short period of time the polymerization reaches the gel stage and thereafter polymerization continues at a higher rate of speed because of the exothermic heat involved, until a cured, hard, substantially completely polymerized mass results—all entirely without the need of applying external heat.

This discovery enables controlling the polymerization in the manufacture of the resin impregnated fabric sheets and boards, to obviate uneven surfacing and obtain smooth surfaces.

The proportion of the hydrazine may range from 0.01 part to about 0.50 part by weight for every 100 parts of the polymerizable resinous material (usually containing about 1 part of the polymerization catalyst).

In practice, the resin mix comprising the catalyst, such as benzoyl peroxide, has incorporated therein a small amount of the hydrazine when the operator is ready for impregnating the fibrous base with the liquid resin. The mix is then applied to the flat fibrous base which is afterwards interleaved with separator sheets, such as Cellophane, where plies of the sheets are to be cured, and the resin allowed to gel at room temperature before the cure. The sheets of impregnated material are then formed on any desired form of any desired shape and cured as usual. Since the resin is already partially polymerized and gelled, there is no tendency for the resin to run away from the fabric base or textile cloth and thereby starved areas on the form part are avoided.

Where thin plies are treated, it is advisable to cure the panels at higher temperature after gelation, because the exothermic heat in thin plies is more quickly dissipated, and thereby would not aid in curing the gel.

In practicing the present invention, the fibrous sheet or sheets, which are to be impregnated with the reactive exothermic polymerizable resinous material, are passed preferably through a bath of the liquid resinous material containing the usual catalyst of polymerization and also the hydrazine, or the resinous material may be otherwise applied to the fabric base. The treated sheets or laminates are then introduced between separator sheets of Holland cloth, or between impervious sheets of paper having smooth surfaces, or between other sheets of substantially impervious material, such as Cellophane, that will not adhere appreciably to the resinous material when cured. The treated sheet or sheets may be cured in a platen press, before or after they are cut to desired size, or cured during passage through a heating zone, utilizing a curing temperature ranging from 175° F. to about 250° F. Also exposure to light radiation (infra red or ultra violet) or electronic waves may be used for hardening the resin.

Any heat-hardenable synthetic resin material that is used for impregnation of woven sheets or fibrous sheets may be used for this invention, so long as the resin material is of the type which hardens to an infusible mass by the application of heat, and passes from a viscous state through an intermediate gelling stage before it reaches the hard infusible state. These resins are generally of the character which, when undergoing polymerization, which term herein includes interpolymerization or cross-polymerization, do not eliminate chemical by-products of reaction, i. e., the polymerized product is composed substantially 100% of all the original polymerizable ingredients and thereby is distinguished from the phenol-aldehydes and urea-aldehydes and other similar resins which in the condensation eliminate water or other materials as by-products. Typical of our impregnating resins amongst others are those described in U. S. Patent to Ellis No. 2,255,313, and British Patents Nos. 540,169 and 540,168, and including those commercial resins which are believed to be essentially heat-hardenable mixtures containing monomeric styrene and a polymeric mixed maleicphthalic diethylene glycol ester. The said Ellis patent refers to the polymerization of polymerizable mixes comprising liquid dihydric alcohol esters of ethylene-alpha-beta-dicarboxylic acids, and liquid monomeric unsaturated polymerizable compounds, in each of which compounds the unsaturation is due to a single terminal ethylenic group which is attached to a negative radical, and in which the said ester is soluble and with which ester it is copolymerizable in the presence of a peroxy polymerization catalyst. For the sake of brevity, our impregnating resins are referred to herein as: "substantially 100% polymerizable" low pressure impregnating resins, as first referred to above. Low pressure resins are understood in the art to refer to resins which are cured or hardened under pressures ranging from atmospheric or less up to about 200 p. s. i.

Inhibitors such as are shown in British Patent No. 540,169 may be present before or during the addition of the hydrazine.

In place of phenyl hydrazine, other hydrazines such as hydrazine, alkyl-substituted hydrazines (sym. and unsym.), other aromatic substituted hydrazines (sym. and unsym.), including unsym. and sym. substituted diphenyl hydrazine (hydrazobenzene), the naphthyl hydrazines (sym. and unsym.), and salts of such hydrazines, e. g., phenyl hydrazine hydrochloride, sulfate, etc., may be used instead, or in admixture with any of the others. The alkyl or aromatic substituents may, in addition, contain non-hydrocarbon substituents such as nitro, bromo, chloro, hydroxy, etc. It therefore may be stated that any chemical containing the essential group >N—N< may be used for the purposes of the invention.

Having thus described our invention, what we claim and desire to protect by Letters Patent is:

1. A substantially 100% polymerizable low pressure impregnating resinous material, which is useful for impregnating fibrous sheets designed to form articles having in part non-horizontal areas, which resinous material is a polymerizable mix comprising a liquid dihydric alcohol ester of an ethylene alpha-beta-dicarboxylic acid, and a liquid monomeric unsaturated polymerizable compound in which the unsaturation is due to a single terminal ethylenic group which is attached to a negative radical, and in which liquid monomer said ester is soluble and with which it is copolymerizable in the presence of a peroxy polymerization catalyst, said catalyst also being present, and additionally, from 0.01 to 0.5 part by weight per 100 parts of the polymerizable mix, of a hydrazine compound selected from the class consisting of hydrazine, aromatic hydrocarbon-substituted hydrazines in which one to two of the hydrogens of hydrazine is replaced by an aromatic hydrocarbon, and mineral acid addition salts thereof.

2. A substantially 100% polymerizable low pressure impregnating resinous material, which is useful for impregnating fibrous sheets designed to form articles having in part non-horizontal areas, which resinous material is a polymerizable mix comprising a liquid dihydric alcohol ester of an ethylene alpha-beta-dicarboxylic acid, and a liquid monomeric unsaturated polymerizable compound in which the unsaturation is due to a single terminal ethylenic group which is attached to a negative radical, and in which liquid monomer said ester is soluble and with which it is copolymerizable in the presence of a peroxy polymerization catalyst, said catalyst also being present, and additionally, from 0.01 to 0.5 part by weight per 100 parts of the polymerizable mix, of an aromatic hydrocarbon hydrazine in which one to two of the hydrogens of hydrazine is replaced by an aromatic hydrocarbon radical.

3. A substantially 100% polymerizable low pressure impregnating resinous material, which is useful for impregnating fibrous sheets designed to form articles having in part non-horizontal areas, which resinous material is a polymerizable mix comprising a liquid dihydric alcohol ester of an ethylene alpha-beta-dicarboxylic acid, and a liquid monomeric unsaturated polymerizable compound in which the unsaturation is due to a single terminal ethylenic group which is attached to a negative radical, and in which liquid monomer said ester is soluble and with which it is copolymerizable in the presence of a peroxy polymerization catalyst, said catalyst also being present, and additionally, from 0.01 to 0.5 parts by weight per 100 parts of the polymerizable mix, of a phenyl hydrazine in which one to two of the hydrogens of hydrazine is replaced by phenyl.

4. In a method of controlling the polymerization of a polymerizable mix comprising a liquid dihydric alcohol ester of an ethylene-alpha-beta-dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding from 0.01 to 0.5 part by weight per 100 parts of the polymerizable mix, of a hydrazine compound selected from the class consisting of hydrazine, aromatic hydrocarbon-substituted hydrazines in which one to two of the hydrogens of hydrazine is replaced by an aromatic hydrocarbon, and mineral acid addition salts thereof.

5. In a method of controlling the polymerization of a polymerizable mix comprising a liquid dihydric alcohol ester of an ethylene-alpha-beta-dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding from 0.01 to 0.5 part by weight per 100 parts of the polymerizable mix, of an aromatic hydrocarbon hydrazine in which one to two of the hydrogens of hydrazine is replaced by an aromatic hydrocarbon radical.

6. In a method of controlling the polymerization of a polymerizable mix comprising a liquid dihydric alcohol ester of an ethylene-alpha-beta-dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding from 0.01 to 0.5 part by weight per 100 parts of the polymerizable mix, of a phenyl-substituted hydrazine in which one to two of the hydrogens of hydrazine is replaced by phenyl.

7. In a method of controlling the polymerization of a polymerizable mix comprising a liquid dihydric alcohol ester of an ethylene-alpha-beta-dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding from 0.01 to 0.5 part by weight per 100 parts of the polymerizable mix, of phenyl hydrazine.

WALTER R. HOOVER.
ROBERT M. PAULSEN.
STEPHEN V. LANDGRAF.

REFERENCES CITED

The following references are of record in the file of this patent:

UNITED STATES PATENTS

| Number | Name | Date |
|---|---|---|
| 2,284,896 | Hanford et al. | June 2, 1942 |
| 1,950,430 | Calcott | Mar. 13, 1934 |
| 1,785,391 | Russell | Dec. 16, 1930 |
| 2,224,992 | Sutherland | Dec. 17, 1940 |
| 2,328,992 | Nielsen | Sept. 7, 1943 |

FOREIGN PATENTS

| Number | Country | Date |
|---|---|---|
| 504,436 | Germany | Aug. 7, 1930 |